United States Patent
Pelletier et al.

(10) Patent No.: US 6,982,748 B2
(45) Date of Patent: Jan. 3, 2006

(54) AUTOMATICALLY SWITCHED CAMERA SYSTEM WITH INDICATOR FOR NOTIFYING THE NEXT SUBJECT OF THE CAMERA SYSTEM

(75) Inventors: Daniel Pelletier, Lake Peekskill, NY (US); George Marmaropoulos, Yorktown Heights, NY (US); Antonio Colmenarez, Maracaibo (VE)

(73) Assignee: Koninklijke Philips Electronics N.V., Eindhoven (NL)

( * ) Notice: Subject to any disclaimer, the term of this patent is extended or adjusted under 35 U.S.C. 154(b) by 852 days.

(21) Appl. No.: 10/084,724

(22) Filed: Feb. 25, 2002

(65) Prior Publication Data

US 2003/0160871 A1 Aug. 28, 2003

(51) Int. Cl.
*H04N 5/232* (2006.01)
*H04N 7/14* (2006.01)

(52) U.S. Cl. .............. 348/211.99; 348/14.11; 348/169

(58) Field of Classification Search .......... 348/207.99, 348/14.08, 14.09, 14.11, 14.16, 211.99, 169

See application file for complete search history.

(56) References Cited

U.S. PATENT DOCUMENTS

| | | | | | |
|---|---|---|---|---|---|
| 5,073,824 | A | * | 12/1991 | Vertin | 348/211.2 |
| 5,704,836 | A | * | 1/1998 | Norton et al. | 463/36 |
| 5,742,329 | A | * | 4/1998 | Masunaga et al. | 348/14.07 |
| 6,275,258 | B1 | * | 8/2001 | Chim | 348/211.12 |
| 6,894,714 | B2 | * | 5/2005 | Gutta et al. | 348/14.07 |

FOREIGN PATENT DOCUMENTS

WO    WO0141428    6/2001

* cited by examiner

*Primary Examiner*—David L. Ometz
*Assistant Examiner*—Lin Ye
(74) *Attorney, Agent, or Firm*—Larry Liberchuk

(57) ABSTRACT

An automatically switched camera system includes sensors for providing data of an image scene having subjects who are behaving in a manner which make them potential targets of the camera system, a pre-take indicator for providing an advanced notification to the subjects of the image scene that one of them is about to become a target of the camera system, a multimodal image analysis module communicating with the sensors and the pre-take indicator, for analyzing the data of the image scene provided by the sensors to select one of the subjects as a target of the camera system and outputting an indicator function command that causes the pre-take indicator to provide the advanced notification to the selected subject.

10 Claims, 2 Drawing Sheets

AUTOMATICALLY SWITCHED CAMERA SYSTEM WITH INDICATOR FOR NOTIFYING THE NEXT SUBJECT OF THE CAMERA SYSTEM

FIELD OF THE INVENTION

This invention relates to camera systems, and more particularly, to an automatically switched camera system having a pre-take indicator for notifying the next subject of the camera system that he or she is about to become the center or attention of the camera system.

BACKGROUND OF THE INVENTION

Automatically switched camera systems (ASCS) have mechanical or electronic pan, tilt, zoom video cameras and heuristic means for deciding when to move the camera, i.e., pan, tilt, and/or zoom the camera, in response to audio or some other automatic driving mechanism. Typical ASCSs employ audio driving mechanisms which are implemented with one or more microphones. An ASCS driven by an audio driving mechanism pans, tilts, and/or zooms the camera toward the sound of a speaker's voice. For a more detailed description of an ASCS, see commonly-assigned, copending U.S. patent application Ser. No. 09/759,486, entitled "Method and Apparatus for Determining Camera Movement Control Criteria", filed on Jan. 12, 2001.

Existing ASCSs, used in applications such as videoconferencing, include various means for indicating who the current or main subject of the ASCS is. For example, the current or main subject can be displayed in a monitor or a picture-in-picture window within a main video conference display. The current or main subject can also be indicated by the turning the mechanical or electronic pan-tilt-zoom camera of the ASCS in the direction of the subject.

Although existing ASCSs indicate who the current or main subject is, such systems do not provide any type of indication of who the next subject will be. This drawback makes it virtually impossible for the next subject to prepare to become the focus of attention of the ASCS or alter their behavior so that they do not become the focus of attention of the ASCS.

Accordingly, an ASCS is needed which is capable of notifying the next subject of the system that he or she is about to be focused on.

SUMMARY OF THE INVENTION

An automatically switched camera system is disclosed herein that is capable of notifying the next subject of the system that he or she is about to be focused or targeted on by the system. The camera system comprises sensor means for providing data of an image scene having subjects who are behaving in a manner which make them potential targets of the camera system, indicating means for providing an advanced notification to the subjects of the image scene that one of them is about to become a target of the camera system, image scene analyzing means communicating with the sensor and the indicating means, for analyzing the data of the image scene provided by the sensor means to select one of the subjects as a target of the camera system and outputting an indicator function command that causes the indicating means to provide the advanced notification to the selected subject.

BRIEF DESCRIPTION OF THE DRAWINGS

The advantages, nature, and various additional features of the invention will appear more fully upon consideration of the illustrative embodiments now to be described in detail in connection with accompanying drawings where like numerals are used to identify like elements and wherein.

It should be understood that the drawings are for purposes of illustrating the concepts of the invention and are not necessarily to scale.

DETAILED DESCRIPTION OF THE INVENTION

Figure 1:
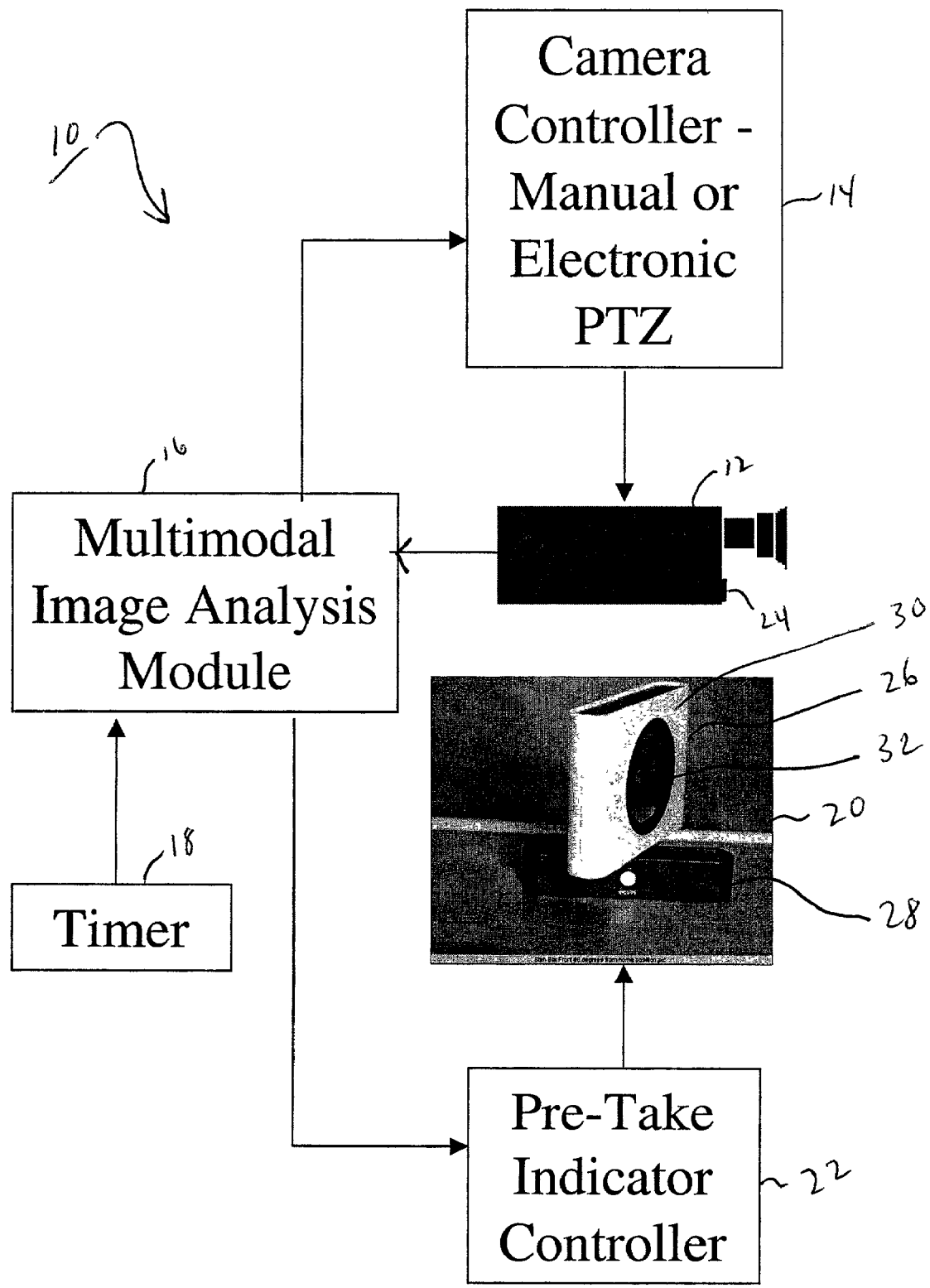
FIG. 1 is a block diagram of an ASCS, according to an exemplary embodiment of the present invention.

The present invention is an ASCS that includes a pre-take indicator for notifying the next subject of the ASCS that he or she is about to be focused or targeted on. FIG. 1 is a block diagram of an ASCS 10, according to an exemplary embodiment of the present invention. The ASCS 10 generally comprises a video camera 12, a camera controller 14, a multimodal image analysis module 16, a timer 18, a pre-take indicator 20 and a pre-take indicator controller 22.

The video camera 12 is used in the ASCS 10 for sensing subjects in an image scene by obtaining a video of the scene. The video camera 12 may be a mechanical pan, tilt, zoom camera or an electronic pan, tilt, zoom camera. Both types of video cameras are well known in the art and therefore, no further discussion of these devices are needed here. The video camera 12 typically includes a microphone 24 for sensing audio produced by the subjects in the image scene. One or more separate microphones (not shown) may also be utiltized in the ASCS 10 in lieu of, or in addition to the microphone 24 of the camera 12. The image scene data sensed by the camera 12 and the microphone(s) 24 is inputted into the multimodal image analysis module 16.

The camera controller 14 receives camera function instructions or commands from the multimodal image analysis module 16, and in response thereto, causes the video camera 12 to pan, tilt, and/or zoom to focus on the main (target) subject of the image scene. The camera controller 14 may be implemented using well known microprocessor or like devices.

The pre-take indicator 20 shows or alerts the next subject of the ASCS 10 that he or she is about to become the focus of attention or target of the ASCS 10. Accordingly, this person can prepare him- or herself to become the target of the ASCS 10, or alter their behavior so that they do not become the target of the ASCS 10. The pre-take indicator 20 can be embodied in any suitable form that is capable of notifying a next subject that he or she is about to become the target of the ASCS 10. By way of example and not limitation, the pre-take indicator 20 may be embodied as a light indicator, an audio indicator, or a PIP display on a main display screen of the ASCS 10.

The pre-take indicator 20 exemplified in FIG. 1 comprises an anthropomorphic device having a head 26 pivotally disposed on a base 28. The head 26 includes a housing 30 having an LCD 32 embedded therein. A face-like image is generated by the head 26 when images of facial features are displayed on the LCD 32. The pre-take indicator controller 22 receives indicator function instructions or commands from the multimodal image analysis module 16, and in response thereto, causes the head of the pre-take indicator 20 to pivot relative to the base 28 and activates the LCD 32 to display the facial images. The pre-take indicator controller 22 may be implemented using well known microprocessor or like devices.

The anthropomorphic pre-take indicator 20 of FIG. 1 operates to notify a "next" subject that he or she is about to become the target of the ASCS 10, by immediately pivoting the head 26 to the subject and "looking" at him or her a predetermined time period before the system focuses on the subject. During this predetermined time period, the subject may prepare for becoming the target of the ASCS 10, or modify his or her behavior in manner which will prevent becoming the target of the ASCS 10.

Still referring to FIG. 1, the timer 18 measures the amount of time a potential subject of the ASCS 10 is doing behavior (talking, moving, etc.) that would cause him or her to become the target of the ASCS 10. If this subject performs this behavior for a predetermined amount of time, the timer 18 communicates this data to the multimodal image analysis module 16.

The multimodal image analysis module 16 includes means for processing the image scene data received from the camera 12 and microphone 24, and the time data received from the timer 18, to output commands or instructions to the camera controller 14 that causes the video camera 12 to focus on a particular subject-target, via panning, tilting and zooming of the camera 12, who is behaving in a manner that is desired to be observed by the ASCS 10. The module 16 also uses the processed image scene and time data to output commands or instructions for activating the pre-take indicator 20. Such processing means are described in detail in the earlier-mentioned U.S. patent application Ser. No. Ser. No. 09/759,486, the disclosure of which is incorporated herein by reference.

Figure 2:
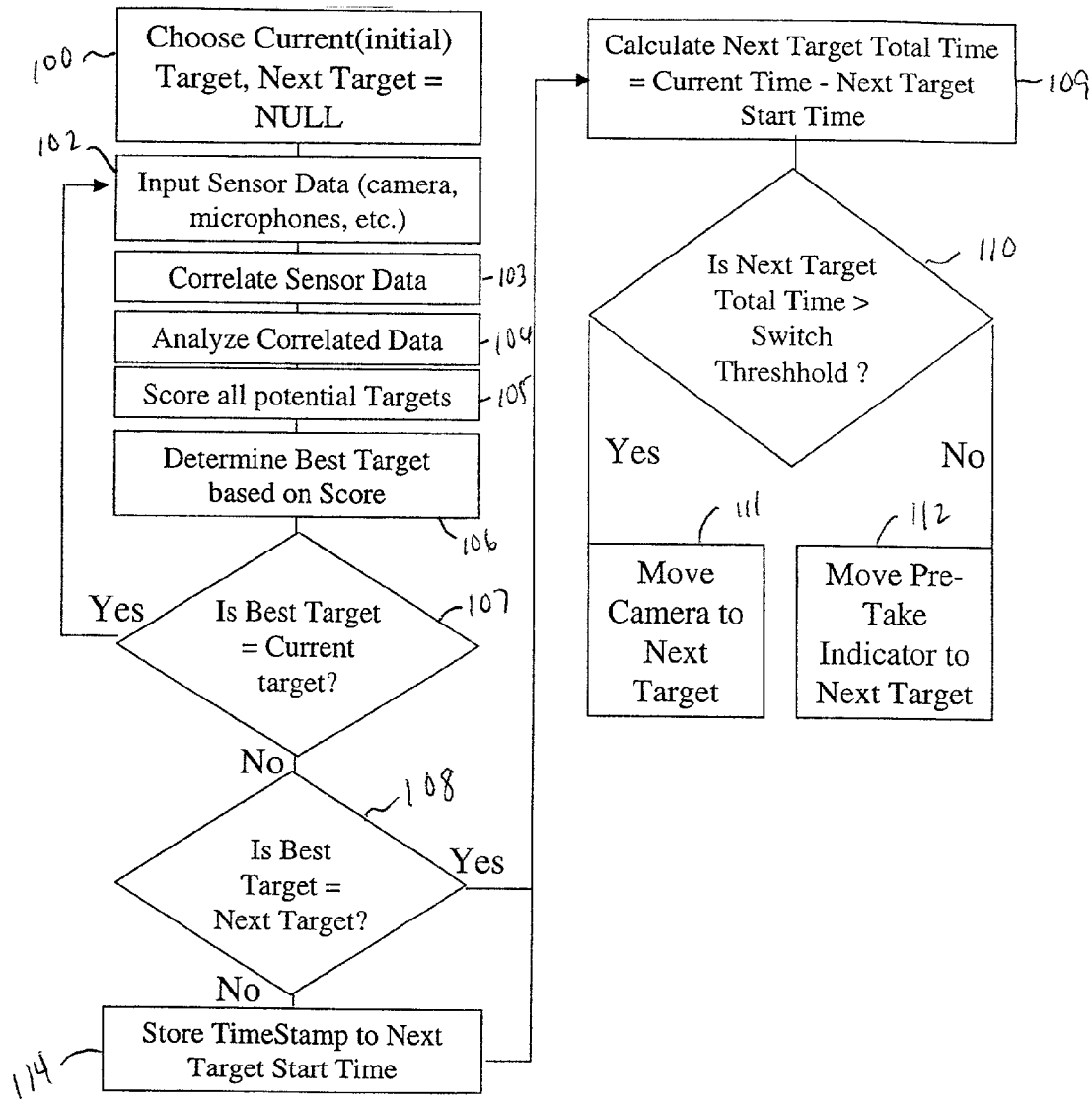
FIG. 2 is a block diagram showing the operation of the ASCS of the invention.

FIG. 2 is a block diagram showing the operation of the ASCS 10 of the invention. In block 100, the multimode image analysis module 16 selects a subject, i.e., an initial or current target, in the image scene obtained by the video camera 12 and microphone 24. This selection may be made arbitrarily or be based on the behavior of the subject (the behavior being of the type which would cause the subject to be a target of the ASCS 10). In block 102, the sensor data (image scene data) generated by the video camera 12, the microphone(s) 14 and the timer 18 are inputted to the multimodal image analysis module 16. The multimodal image analysis module 16 correlates the sensor data in block 103, analyzes the correlated data in block 104, to score all potential targets in block 105.

In block 106, the multimodal image analysis module 16 determines the best target based on the score calculated in block 105. In decision block 107, if the current target is the best target, i.e., the target performing a behavior most desired by the ASCS 10, then the process of blocks 102–107 are repeated. If the current target is not the best target in block 107, then in decision block 108, the next target is evaluated to determine if it is the best target. If the next target is determined to be the best target in block 108, then the total time of the next target's behavior is calculated by the module 16 in block 109. If the next target is determined to not be the best target in block 108, then a timestamp indicating the start time of the next target's behavior is stored in block 114, and the total time of the next target's behavior is calculated in block 109. The total time of the next target's behavior may be calculated by subtracting the start time of the next target's behavior from the current time.

In decision block 110, if the total time of the next target's behavior is determined by the multimode image analysis module 16 to be greater than a predetermined time threshold for switching to another target, the module 16 in block 111 outputs instructions to the camera controller 14 to move the video camera 12 to the next target. If in decision block 110, the total time of the next target's behavior is less than the predetermined time threshold for switching to another target, the module 16 outputs instructions in block 112 to the pre-take indicator controller 22 to move the pre-take indicator 20 to the next target.

While the foregoing invention has been described with reference to the above embodiment, various modifications and changes can be made without departing from the spirit of the invention. Accordingly, all such modifications and changes are considered to be within the scope of the appended claims.

What is claimed is:

1. An automatically switched camera system comprising:
    sensor means for providing data of an image scene having subjects who are behaving in a manner which make them potential targets of the camera system;
    indicating means for providing an advanced notification to the subjects of the image scene that one of them is about to become a target of the camera system;
    image scene analyzing means communicating with the sensor and the indicating means, the analyzing means for analyzing the data of the image scene provided by the sensor means to select one of the subjects as a target of the camera system and outputting an indicator function command that causes the indicating means to provide the advanced notification to the selected subject.

2. The camera system according to claim 1, wherein the sensor means includes a video camera having at least one of panning means, tilting means, and lens zooming means.

3. The camera system according to claim 2, further comprising controller means communicating with the sensor means and the image scene analyzing means, the controller means for selectively controlling the camera of the sensor means in response to commands outputted from the image scene analyzing means.

4. The camera system according to claim 1, further comprising timing means communicating with the image scene analyzing means, the timing means for measuring the amount of time the subjects perform the behavior which makes them potential targets of the camera system, the timing means outputting the time to the image scene analyzing means.

5. The camera system according to claim 1, further comprising controller means communicating with the image scene analyzing means and the indicating means, the controller means for selectively activating the indicating means in response to commands outputted from the image scene analyzing means.

6. The camera system according to claim 1, wherein the indicating means comprises at least one of a light indicator, an audio indicator, a PIP display, and an anthropomorphic device.

7. The camera system according to claim 1, wherein the image scene analyzing means comprises a multimodal image analysis module.

8. A pre-take indicator for use with an automatically switched camera system, the pre-take indicator comprising:
    indicating means for providing an advanced notification to subjects of an image scene that one of them is about to become a target of the system,
    control means communicating with the indicating means and the automatically switched camera system, the control means for activating the indicating means in response to commands received from the automatically switched camera system when the system has selected one of the subjects as a target of the system.

9. A method for providing advanced notification to subjects of image scene one of them is about to become a target of an automatically switched camera system including sensor means for providing data of an image scene having subjects who are behaving in a manner which make them potential targets of the camera system and image scene analyzing means for analyzing the data of the image scene provided by the sensor means to select one of the subjects as a target of the camera system, the method comprising:

providing indicating means for notifying the subjects of the image scene that one of them is about to become a target of the camera system;

analyzing the data of the image scene obtained with sensors using the analyzing means;

selecting one of the subjects with target selection means, who is behaving in a manner which makes them a best target of the camera system; and activating the indicating means to notify the subject that has been selected to become the target of the camera system.

10. The method according to claim 9, wherein the activating step is performed prior to the subject becoming the target of the camera system.

* * * * *